(12) United States Patent
Livet et al.

(10) Patent No.: US 9,019,993 B2
(45) Date of Patent: *Apr. 28, 2015

(54) METHOD FOR SENDING AN ACKNOWLEDGEMENT TO AN INGRESS MESH POINT IN A MESH NETWORK AND A MEDIUM ACCESS CONTROL FRAME FORMAT

(71) Applicant: InterDigital Technology Corporation, Wilmington, DE (US)

(72) Inventors: Catherine Livet, Montreal (CA); Guang Lu, Dollard-des-Ormeaux (CA); Juan Carlos Zuniga, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/186,408

(22) Filed: Feb. 21, 2014

(65) Prior Publication Data

US 2014/0169306 A1   Jun. 19, 2014

Related U.S. Application Data

(63) Continuation of application No. 11/202,974, filed on Aug. 12, 2005, now Pat. No. 8,699,525.

(60) Provisional application No. 60/608,763, filed on Sep. 10, 2004.

(51) Int. Cl.
  *H04J 3/24*    (2006.01)
  *H04L 5/00*   (2006.01)
  (Continued)

(52) U.S. Cl.
  CPC ............ *H04L 5/0055* (2013.01); *H04L 1/1607* (2013.01); *H04L 45/00* (2013.01);
  (Continued)

(58) Field of Classification Search
  CPC ......... H04J 3/24; H04W 84/18; H04W 56/00; H04W 40/10; H04W 8/005; H04B 1/7143

USPC .......................... 370/475, 338, 328, 329, 254
  See application file for complete search history.

(56) References Cited

U.S. PATENT DOCUMENTS

6,041,057 A   3/2000 Stone
6,111,858 A   8/2000 Greaves
(Continued)

FOREIGN PATENT DOCUMENTS

CN   1463522   12/2003
EP   1 065 839   1/2001
(Continued)

OTHER PUBLICATIONS

"A compilation based on IEEE Std 802.11—1999 (R2003) and its amendments", Sep. 19, 2003, 706 pages.
(Continued)

*Primary Examiner* — Jamal Javaid
(74) *Attorney, Agent, or Firm* — Eric Berkowitz

(57) ABSTRACT

The present invention relates to a method for confirming the delivery of a data packet in a mesh network by sending an acknowledgement (ACK) to an ingress mesh point (IMP). A mesh network comprises a plurality of mesh points that are wirelessly linked together. A data packet sent by a station (STA) is received by an IMP. A MAC frame is generated for transmission of the data packet and the frame is forwarded to an egress mesh point (EMP) in order to provide a service by the mesh network. The MAC frame includes a field comprising an IMP address and an EMP address. When the EMP, (or optionally an intermediate mesh point), receives a data packet successfully, the EMP or the intermediate mesh point sends an ACK to the IMP or preceding mesh point.

16 Claims, 3 Drawing Sheets

(51) Int. Cl.
  *H04L 1/16* (2006.01)
  *H04L 12/701* (2013.01)
  *H04L 12/801* (2013.01)
  *H04W 40/24* (2009.01)
  *H04L 1/00* (2006.01)
  *H04W 28/04* (2009.01)
  *H04W 84/18* (2009.01)

(52) U.S. Cl.
  CPC .............. *H04L 47/10* (2013.01); *H04L 47/14* (2013.01); *H04L 2001/0092* (2013.01); *H04W 28/04* (2013.01); *H04W 40/24* (2013.01); *H04W 84/18* (2013.01)

(56) References Cited

U.S. PATENT DOCUMENTS

| | | | |
|---|---|---|---|
| 6,118,765 A * | 9/2000 | Phillips | 370/235 |
| 6,151,324 A * | 11/2000 | Belser et al. | 370/397 |
| 6,757,286 B1 | 6/2004 | Stone | |
| 6,922,557 B2 | 7/2005 | Fantaske | |
| 6,928,054 B1 * | 8/2005 | Montuno et al. | 370/235 |
| 7,263,379 B1 | 8/2007 | Parkulo | |
| 7,385,976 B2 * | 6/2008 | Gu et al. | 370/389 |
| 2002/0045435 A1 | 4/2002 | Fantaske | |
| 2002/0071439 A1 * | 6/2002 | Reeves et al. | 370/400 |
| 2003/0114153 A1 | 6/2003 | Shaver et al. | |
| 2004/0165600 A1 | 8/2004 | Lee | |
| 2004/0258215 A1 | 12/2004 | DeVito et al. | |
| 2005/0213740 A1 | 9/2005 | Williams et al. | |
| 2005/0238054 A1 * | 10/2005 | Sharma | 370/473 |
| 2006/0041891 A1 | 2/2006 | Aaron | |

FOREIGN PATENT DOCUMENTS

| | | |
|---|---|---|
| JP | 2001-016264 | 1/2001 |
| KR | 1997-0055800 | 5/1999 |
| KR | 100223984 B1 | 10/1999 |
| KR | 102003006410 | 7/2003 |
| RU | 2004117074 | 5/2005 |
| UA | 32414 | 12/2000 |
| WO | WO-02/093844 | 11/2002 |

OTHER PUBLICATIONS

"Chinese Second Notification of Office Action and Search Report", Chinese Patent Application No. 201110078757.9, Nov. 23, 2012, 5 pages.

"Chinese Second Notification of Office Action and Search Report (English Translation)", Chinese Patent Application No. 201110078757.9, Nov. 23, 2012, 6 pages.

"Georgian Search Report", Patent Application No. AP 2005 009976, Sep. 24, 2008, 1 page.

"Korean Notice of Allowance of Patent", Korean Patent Application No. 10-2010-0098496, Nov. 20, 2012, 2 pages.

"Korean Notice of Allowance of Patent (English Translation)", Korean Patent Application No. 10-2010-0098496, Nov. 20, 2012, 1 page.

"Korean Office Action (English Translation)", Korean Application No. 2006-9003863, Nov. 15, 2006, 3 pages.

"United States Final Rejection Action", U.S. Appl. No. 11/202,974, Mar. 2, 2011, 34 pages.

"United States Non-Final Office Action", U.S. Appl. No. 11/202,974, Sep. 16, 2010, 28 pages.

"United States Non-Final Rejection", U.S. Appl. No. 11/202,974, Jul. 9, 2008, 42 pages.

"United States Office Action", U.S. Appl. No. 11/202,974, Jun. 6, 2013, 29 pages.

IEEE, "Part 11: Wireless Medium Access Control (MAC) and Physical Layer (PHY) specifications: Amendment 7: Medium Access Control (MAC) Quality of Service (QoS) Enhancements", IEEE P802.11e/D9.0, Aug. 2004, 193 pages.

So, Tricci, et al., "Draft Terms and Definitions for 802.11s", IEEE P802.11 04/0730-R3, Jul. 2004, 5 pages.

* cited by examiner

METHOD FOR SENDING AN ACKNOWLEDGEMENT TO AN INGRESS MESH POINT IN A MESH NETWORK AND A MEDIUM ACCESS CONTROL FRAME FORMAT

CROSS REFERENCE TO RELATED APPLICATION

This application is a Continuation of U.S. patent application Ser. No. 11/202,974 filed Aug. 12, 2005, which claims the benefit of U.S. provisional application No. 60/608,763 filed Sep. 10, 2004, the contents of each being incorporated by reference as if fully set forth herein.

FIELD OF INVENTION

The present invention relates to wireless communication systems. More particularly, the present invention relates to a method for sending an acknowledgement (ACK) to an ingress mesh point (IMP) in a mesh network and a medium access control (MAC) frame format.

BACKGROUND

A mesh wireless local area network (WLAN) is a wireless network comprising two or more mesh points interconnected via wireless links. The mesh network typically serves one or more wireless stations (STAs) within the operating range of the mesh network. A mesh point is any entity within the mesh network which contains a MAC and physical layer (PHY) interface to a wireless medium and supports WLAN mesh services. An IMP is a mesh point through which data enters the mesh WLAN and an egress mesh point (EMP) is a mesh point through which data exits the mesh WLAN. Data sent by a STA is routed from the IMP to the EMP through the mesh WLAN.

IEEE 802.11 standards are one of the standards defining the wireless protocol for a mesh WLAN. Current IEEE 802.11 standards define an acknowledged mode that allows for more reliable data delivery at the lower layers. However, the current acknowledgement mechanism does not work in a mesh network since multiple hops are required over the mesh network before the data is delivered to the destination.

In a mesh WLAN, a communication between an IMP and an EMP can be required. As shown in FIG. 2, a prior art MAC frame does not contain IMP MAC address during the multi-hop transmissions. Therefore, the EMP is unable to identify and communicate with the IMP. There is no mechanism or frame format for sending an acknowledgement between the IMP and the EMP in the mesh WLAN. This seriously limits the reliability of the data delivery. Since there is no ACK mechanism between the IMP and the EMP, the IMP cannot know if the data through the mesh network has been correctly received by the EMP.

SUMMARY

The present invention relates to a method for confirming the delivery of a data packet in a mesh network by sending an ACK to an IMP. The mesh network comprises a plurality of mesh points that are wirelessly linked together. A data packet sent by a STA is received by an IMP. A MAC frame is generated for transmission of the data packet and the frame is forwarded to an EMP in order to provide a service by the mesh network. The MAC frame includes a field comprising an IMP address and an EMP address. When the EMP, (or optionally an intermediate mesh point), receives a data packet successfully, the EMP or the intermediate mesh point sends an ACK to the IMP or preceding mesh point.

BRIEF DESCRIPTION OF THE DRAWINGS

A more detailed understanding of the invention may be had from the following description of a preferred embodiment, given by way of example and to be understood in conjunction with the accompanying drawing wherein.

DETAILED DESCRIPTION OF THE PREFERRED EMBODIMENTS

Hereafter, the terminology "station" (STA) includes but is not limited to a user equipment, a wireless transmit/receive unit (WTRU), a fixed or mobile subscriber unit, a pager, or any other type of device capable of operating in a wireless environment. When referred to hereafter, the terminology "mesh point" includes but is not limited to a Node-B, a base station, a site controller, an access point or any other type of interfacing device in a wireless environment.

The present invention is applicable to any wireless mesh networks including, but not limited to, IEEE 802.11, IEEE 802.11s, IEEE 802.15, IEEE 802.15.5.

Figure 1:
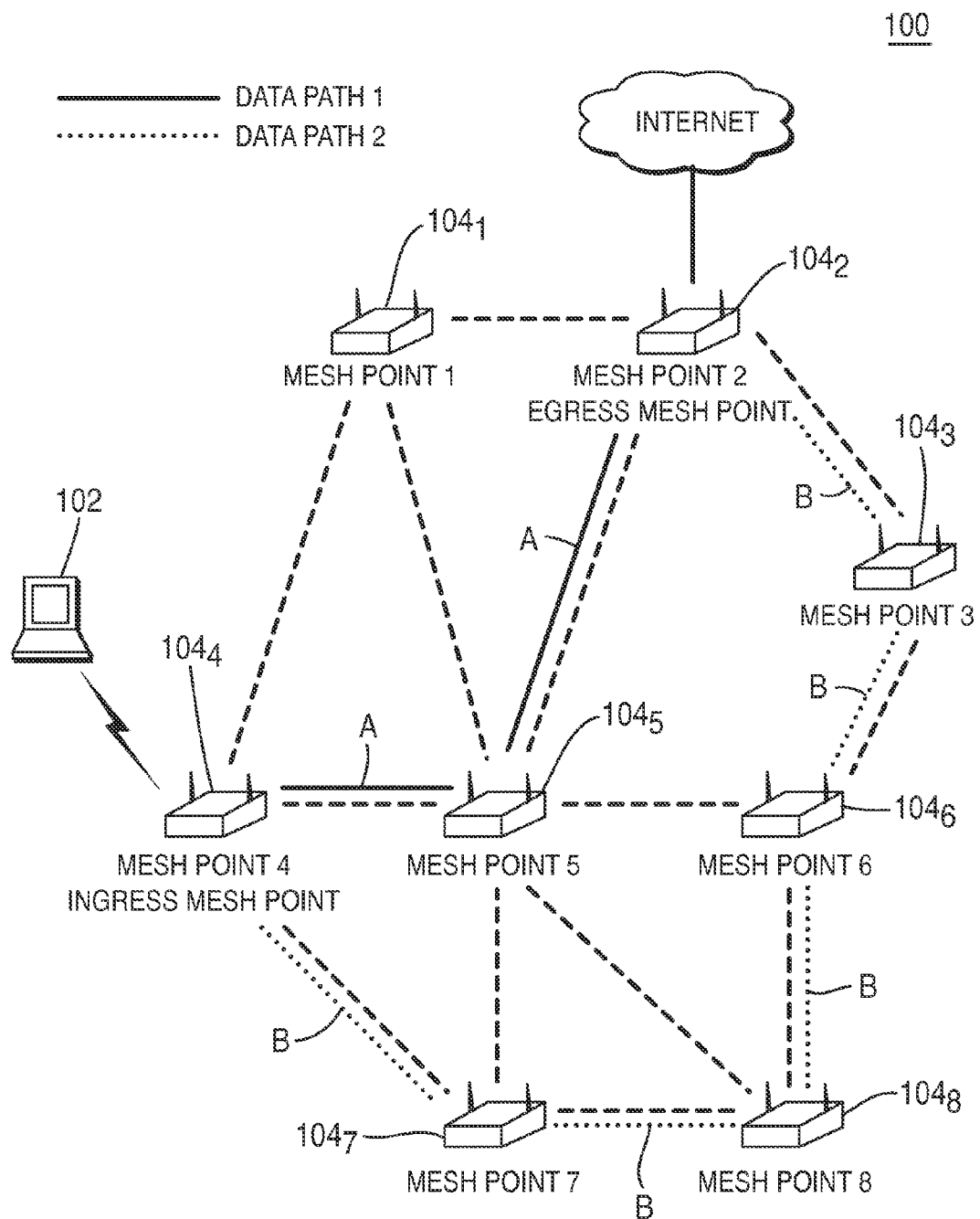
FIG. 1 is a diagram of a mesh WLAN in which the present invention is implemented.

FIG. 1 is a diagram of an exemplary mesh WLAN 100 comprising eight (8) mesh points $104_1$-$104_8$. In this example, mesh point $104_4$ is an IMP for the STA 102 and mesh point $104_2$ is an EMP for the data sent by the STA 102.

Data sent by the STA 102 is routed from one mesh point $104_4$ to another mesh point $104_2$ through the intermediate mesh points in the mesh WLAN 100 for the Internet access. Multiple data paths can be established within the mesh WLAN 100. As an example, two different data paths from the IMP mesh point $104_4$ to the EMP mesh point $104_2$ are illustrated by the solid lines designated "A" and "B" in FIG. 1.

Figure 2:
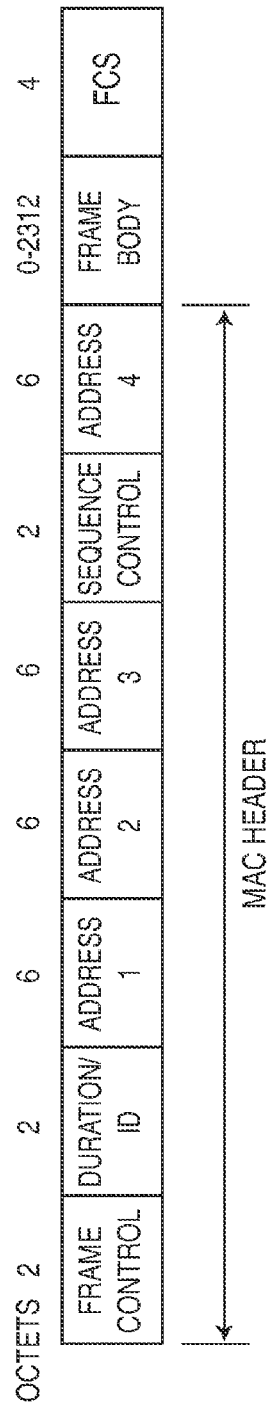
FIG. 2 is a diagram of a prior art MAC frame.
Figure 4:
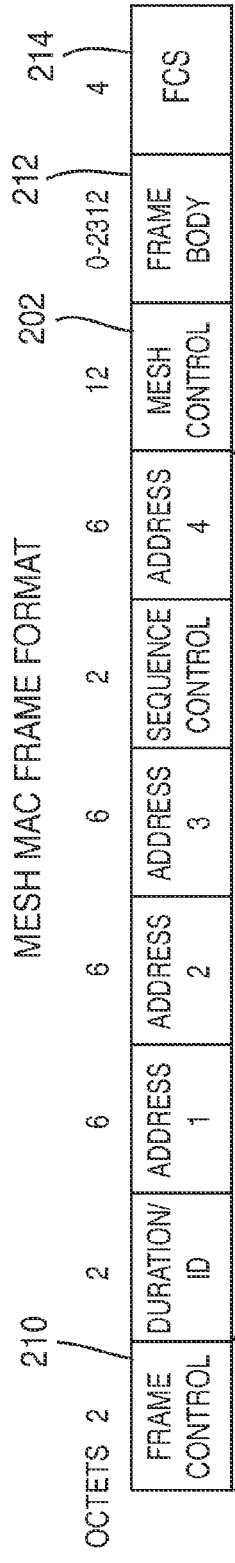
FIG. 4 is a diagram of a mesh MAC frame in accordance with the present invention.
Figure 4:
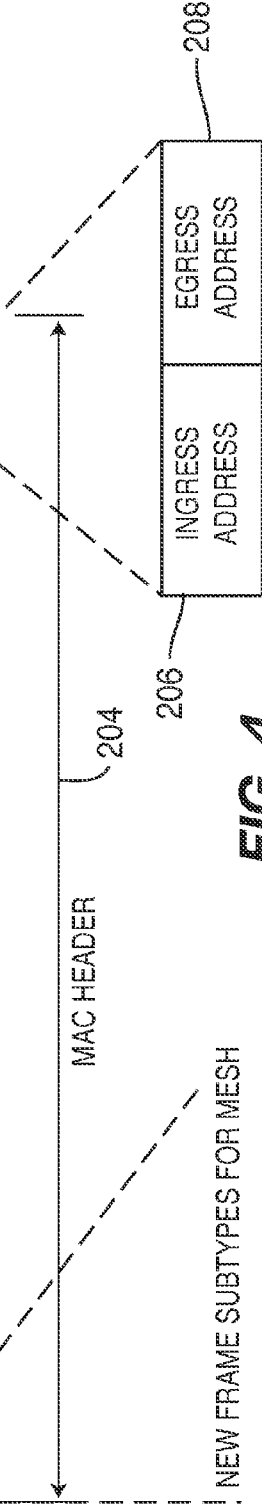

As aforementioned with reference to FIG. 2, a drawback with the prior art 802.11 MAC frame format is that the IMP address is not included in the MAC frame in a multi-hop transmission. The present invention solves this problem by including the IMP address in the MAC frame 400. Referring to FIG. 4, a diagram of a mesh MAC frame 200 in accordance with the present invention is shown. The MAC frame 200 includes a MAC header 204, a frame body 212 and a frame check sequence (FCS) field 214. This aspect of the MAC frame format is same to the one in prior art, which guarantees backward compatibility. The MAC header 204 includes a frame control, a duration/ID, address 1, address 2, address 3, a sequence control and address 4. These elements are well known to those of skill in the art.

In accordance with the present invention, however, the MAC header 204 further includes a mesh control field 202. The mesh control field 202 comprises an IMP address field 206 and an EMP address field 208. The receiving mesh point recognizes the IMP $104_4$ and the EMP $104_2$ with the mesh control field 202 and may send an ACK to the IMP $104_4$ or other intermediate mesh point in accordance with the IMP address field 206. It should be noted that the MAC frame format in FIG. 4 is provided as an example and the mesh control field 202 may be included in any location in the MAC frame 200 and the length of the IMP and EMP address fields may vary.

A routing function is available in each mesh point, which allows the mesh point, based on the EMP address included in the mesh control field 202, to know which path used to route the data. When the IMP $104_4$ receives an ACK, the IMP $104_4$ can discard the related data in its queue. If the IMP $104_4$ receives a non-acknowledgement (NACK), the IMP $104_4$ re-transmits the data. To avoid any buffer overflow, the IMP $104_4$ should discard the data from its queue after a certain amount of time (time-out) if the IMP $104_4$ does not receive ACK nor NACK from the EMP $104_2$.

Figure 3:
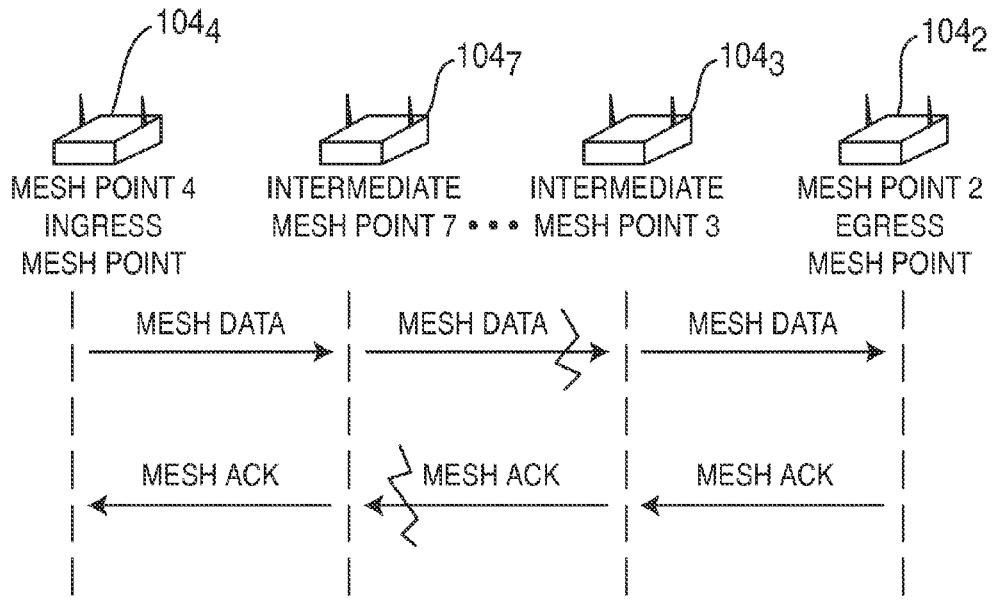
FIG. 3 is a signaling diagram for transmission of data and acknowledgement between an IMP, an EMP and intervening mesh points in accordance with the present invention.

FIG. 3 is a signaling diagram for transmission along data path "B" of a data packet and an ACK between an IMP (in this example mesh point $104_4$), an EMP (in this example mesh point $104_2$) and intermediate mesh points $104_7$, $104_8$, $104_6$, $104_3$, (not all of which are shown in FIG. 3 for convenience), in accordance with the present invention. The data packet is forwarded from the IMP $104_4$ to the EMP $104_2$ through the intermediate mesh points $104_7$, $104_8$, $104_6$, $104_3$. As will be explained in detail hereinafter, the MAC frame 200 contains both IMP $104_4$ and EMP $104_2$ addresses in the IMP address field 206 and the EMP address field 208. When the intermediate mesh points $104_7$, $104_8$, $104_6$, $104_3$ and the EMP $104_2$ receive a data packet successfully, the intermediate mesh points $104_7$, $104_8$, $104_6$, $104_3$ and the EMP $104_2$ send an ACK to either the preceding intermediate mesh point or the IMP $104_4$. It should be noted that FIG. 3 is an example and zero or any number of intermediate mesh points may exist between the IMP $104_4$ and the EMP $104_2$. Additionally, the intermediate mesh points used to send the ACK may be same mesh points via which the data packet is forwarded or may be different mesh points.

The acknowledgement mechanism of the present invention supports both single and multiple-hop data delivery over a mesh WLAN. The acknowledgement mechanism operates in four modes: 1) EMP-to-IMP data acknowledgement for more reliable data transfer, (e.g., FTP, HTTP); 2) single-hop data acknowledgement for reliable data transfer; 3) combined EMP-to-IMP and single-hop data acknowledgement for very-reliable data transfer, (e.g., signaling); and 4) no acknowledgement for high-throughput, packet-loss resilient, delay sensitive data transfer, (e.g., video/audio streaming).

In the first mode, (EMP-to-IMP acknowledgement), the acknowledgement is done through all the paths. Whenever the EMP receives a packet sent by the IMP, the EMP sends back an ACK to the originator using the IMP address included in the received packet.

In the second mode, (single hop acknowledgement), the acknowledgement is done at every hop between the transmitting mesh point and the next immediate receiving mesh point.

The third mode, (combined EMP-to-IMP acknowledgement and single hop acknowledgement), combines the first mode and the second mode.

In the fourth mode, no acknowledgement is required between the IMP and the EMP. Although this impacts the reliability of the data delivery, it reduces the delay in transmission.

A new frame subtype for the frame subtype information element in the frame control field 210 (shown in FIG. 4) is also defined for indicating that the MAC frame 200 includes the IMP address field 206 and the EMP address field 208. The frame control field 210 may also inform which acknowledgement mode among the four modes stated above is to be used for this data packet.

For the first and third mode among the four modes stated above, the MAC frame format allows for an EMP-to-IMP ACK to be transmitted through another path different from the one used for transmission of the data packet. To reduce the delay of transmission, the sender does not need to wait for the ACK to be received before sending the next frame, (i.e., sending and acknowledging can be asynchronous). In this case the bulk ACK can be used to reduce traffic on the network. An ACK can also be sent purposely via different paths depending on the traffic level in order to reduce contention of ACKs with data. This mechanism could be used for delay sensitive and error tolerant applications such as voice application.

Figure 5:
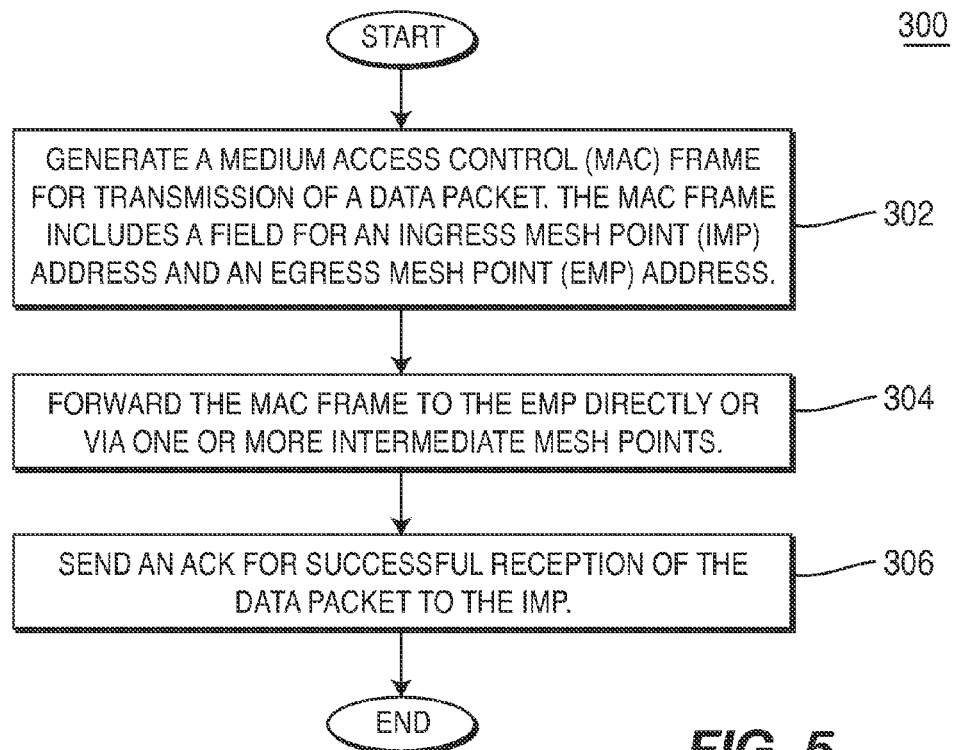
FIG. 5 is a flow diagram of a process for sending an ACK to the IMP in accordance with the present invention.

FIG. 5 is a flow diagram of a process 300 for sending an ACK to the IMP in accordance with the present invention. A MAC frame is generated by attaching a MAC header to a data packet (step 302). The MAC header includes fields for an IMP address and an EMP address. The MAC frame is forwarded to the EMP either directly or via one or more intermediate mesh points (step 304). The intermediate mesh point, if there is any, and the EMP sends an ACK for successful reception of the data packet to the IMP (step 306).

Although the features and elements of the present invention are described in the preferred embodiments in particular combinations, each feature or element can be used alone without the other features and elements of the preferred embodiments or in various combinations with or without other features and elements of the present invention.

What is claimed is:

1. In a mesh wireless communication system comprising a plurality of mesh points that are wirelessly linked together such that a data packet sent by a station (STA) is received by an ingress mesh point (IMP) and forwarded to an egress mesh point (EMP) in order to provide a service by the mesh wireless communication system, a method for sending an acknowledgement (ACK) for the data packet to the IMP, comprising:

generating a medium access control (MAC) frame for transmission of a data packet, the MAC frame including a field comprising an IMP address and an EMP address;

forwarding the MAC frame to the EMP via zero or more intermediate mesh point; and sending an ACK for successful reception of the data packet to the IMP, wherein a frame control field of the MAC frame indicates that the MAC frame contains the IMP address and the EMP address.

2. The method of claim 1, wherein the frame control field of the MAC frame indicates an acknowledgement mode to be used for the data packet.

3. The method of claim 1, wherein the ACK is sent in one of: (1) an EMP-to-IMP data acknowledgement mode; (2) a single-hop data acknowledgement mode; or (3) a combined EMP-to-IMP and single-hop data acknowledgement mode.

4. A method for routing a data packet in a mesh network, the method comprising:

receiving a data packet of a data communication that is sent towards a destination address from a source address, the data packet including control information that contemporaneously indicates a first address, as the source address, a second address, as the destination address, a third address for an ingress mesh point (IMP) through which data packets enter the mesh network and a fourth address for an egress mesh point (EMP) through which data packets exit the mesh network; and processing the control information to determine whether the data packet includes the IMP address and the EMP address.

5. The method of claim 4, further comprising:
determining, by a station receiving the data packet, whether the station is the EMP for the data packet using the address of the EMP indicated by the control information.

6. The method of claim 4, wherein the control information indicates the first, second, third and fourth addresses in a media access control (MAC) header.

7. The method of claim 4, wherein the control information indicates six different addresses in a media access control (MAC) header.

8. The method of claim 4, wherein the control information is selectable to indicate four addresses or six addresses in a media access control (MAC) header.

9. The method of claim 4, further comprising:
on condition that the station receiving the data packet is the EMP, sending, by the EMP, an acknowledgement destined for the IMP indicating successful reception of the received data packet of the data communication.

10. The method of claim 4, wherein the control information indicates one of: (1) an EMP-to-IMP data acknowledgement mode; (2) a single-hop data acknowledgement mode; or (3) a combined EMP-to-IMP and single-hop data acknowledgement mode.

11. A station (STA), comprising:
a receiver and a processor configured to:
receive a data packet of a data communication that is sent towards a destination address from a source address, the data packet including control information that contemporaneously indicates a first address, as the source address, a second address, as the destination address, a third address for an ingress mesh point (IMP) through which data packets enter the mesh network and a fourth address for an egress mesh point (EMP) through which data packets exit the mesh network; and
process the control information to determine whether the data packet includes the IMP address and the EMP address.

12. The STA of claim 11, wherein the processor is configured to:
determine whether the STA is the EMP for the data packet using the address of the EMP indicated by the control information; and
on condition that the STA is the EMP, send an acknowledgement destined for the IMP indicating successful reception of the received data packet of the data communication.

13. The STA of claim 11, wherein the STA is configured to determine a mode of acknowledgment for the STA based on the control information of the data communication indicating one of: (1) an EMP-to-IMP data acknowledgement mode; (2) a single-hop data acknowledgement mode; or (3) a combined EMP-to-IMP and single-hop data acknowledgement mode.

14. The STA of claim 1, wherein the control information indicates the first, second, third and fourth addresses in a media access control (MAC) header.

15. The STA claim 11, wherein the control information indicates six different addresses in a media access control (MAC) header.

16. The STA of claim 11, wherein the control information is selectable to indicate four addresses or six addresses in a media access control (MAC) header.

* * * * *

UNITED STATES PATENT AND TRADEMARK OFFICE
CERTIFICATE OF CORRECTION

PATENT NO. : 9,019,993 B2
APPLICATION NO. : 14/186408
DATED : April 28, 2015
INVENTOR(S) : Catherine Livet, Guang Lu and Juan Carlos Zuniga Page 1 of 1

It is certified that error appears in the above-identified patent and that said Letters Patent is hereby corrected as shown below:

Title Page

In the reference section, on page 2, replace "KR 102003006410" with --KR 1020030064100--.

Claims

In claim 14, at column 6, line 25, replace the phrase "The STA of claim 1" with --The STA of claim 11--.

In claim 15, at column 6, line 28, replace the phrase "The STA claim 11" with --The STA of claim 11--.

Signed and Sealed this
Fifth Day of January, 2016

Michelle K. Lee
*Director of the United States Patent and Trademark Office*